3,510,467
PROCESS FOR THE EMULSION POLYMERIZATION
OF CONJUGATED DIENES WITH MERCAPTAN
MODIFIER
Adrien Azoulay, Paris, and Jean Teitgen, Arthez de
 Bearn, France, assignors to Societe Nationale des
 Petroles d'Aquitaine, Courbevoie, France
Filed Oct. 19, 1967, Ser. No. 676,553
Claims priority, application France, Oct. 26, 1966,
 81,615; Oct. 9, 1967, 123,734
Int. Cl. C08d 1/09, 1/24, 1/36
U.S. Cl. 260—94.4                                    8 Claims

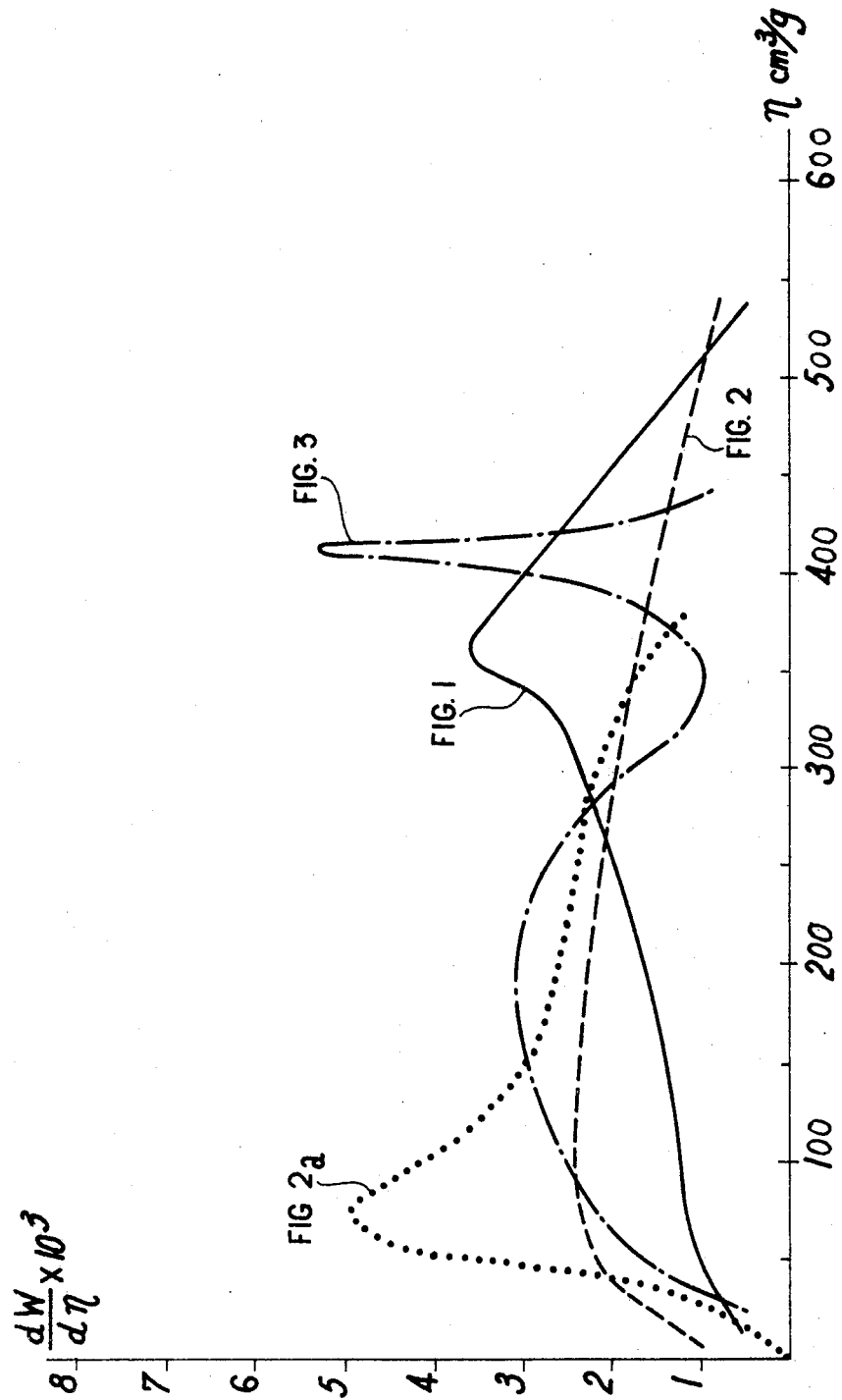

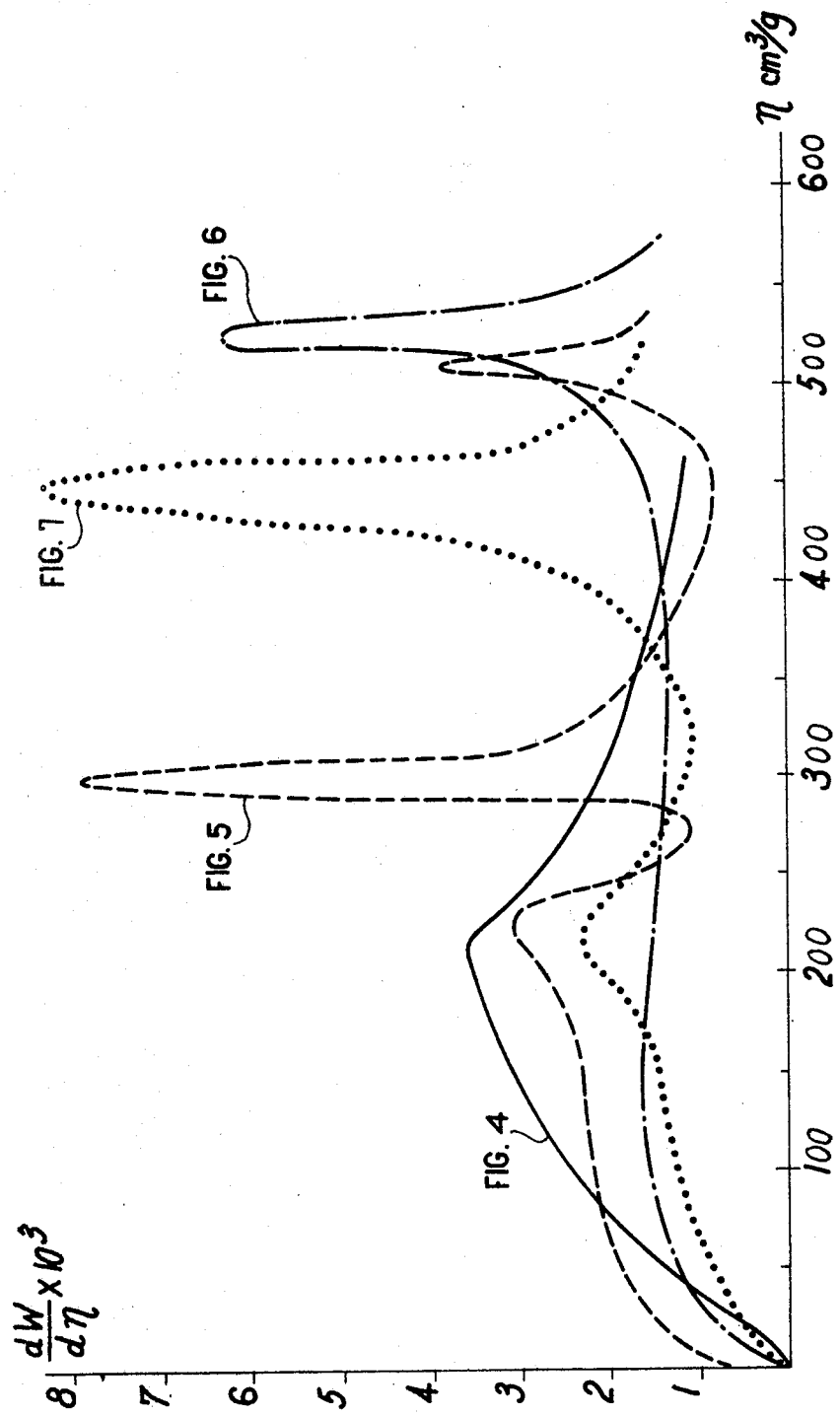

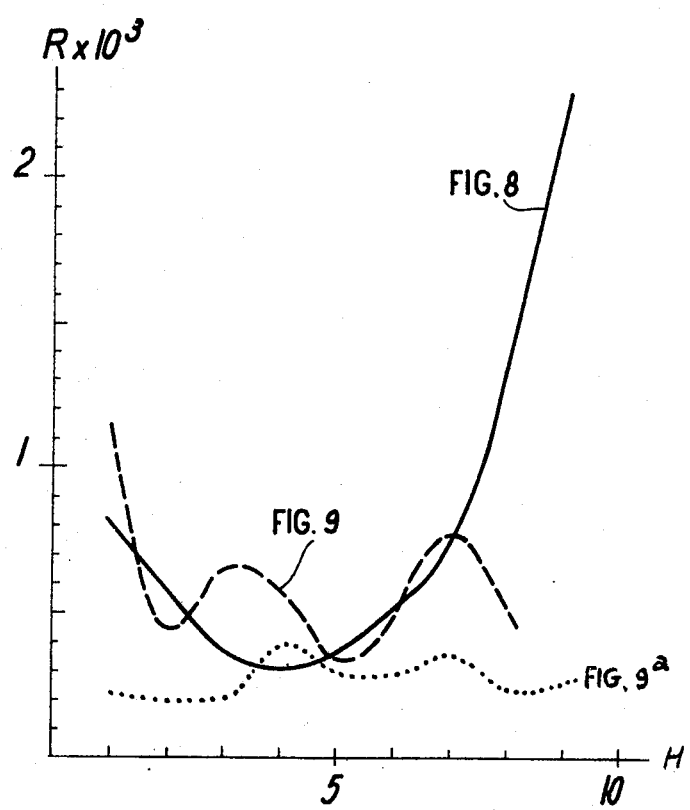

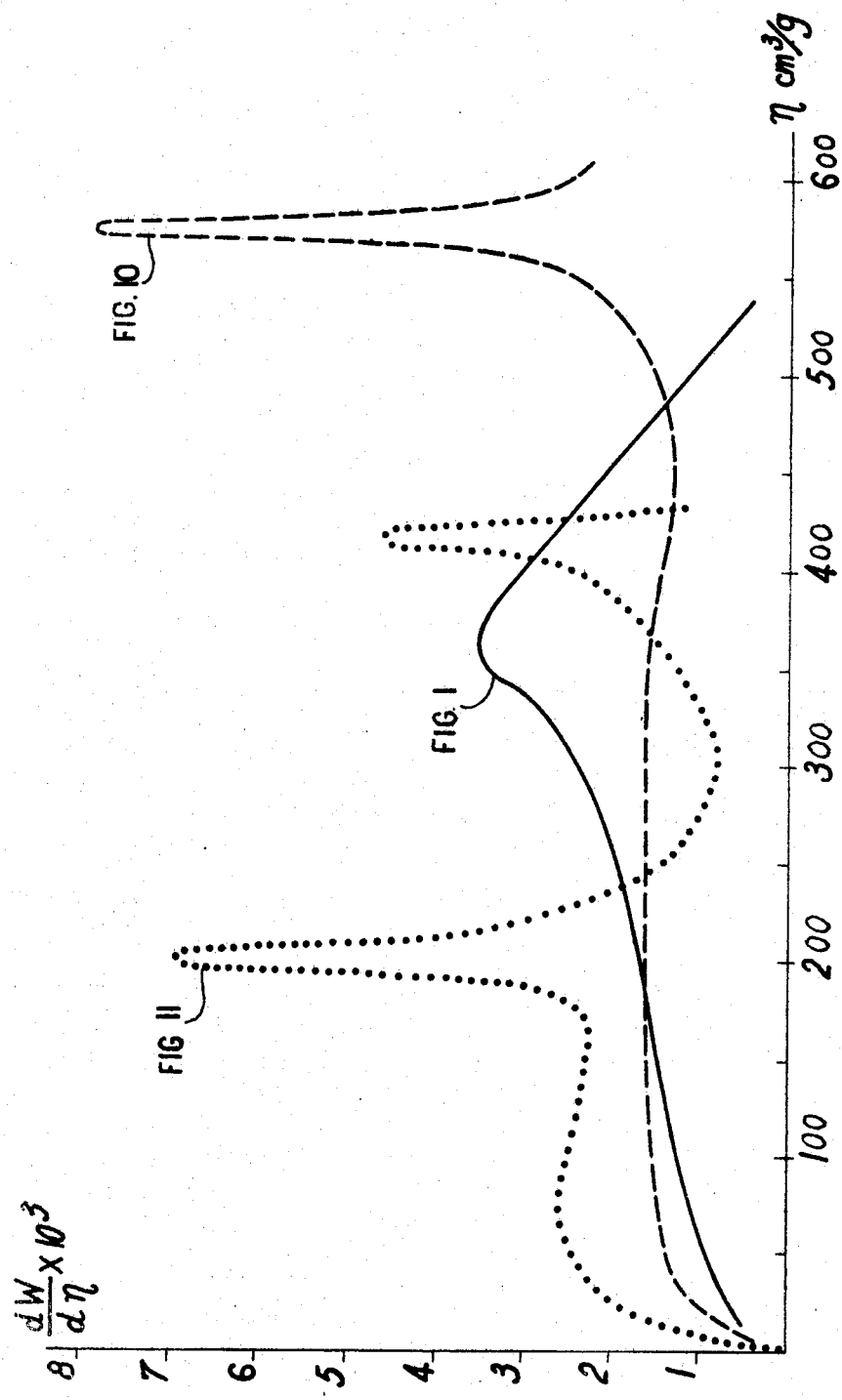

ABSTRACT OF THE DISCLOSURE

Improvement in the manufacture of polymers of conjugated dienes, particularly butadiene and isoprene, in aqueous emulsion, in the presence of a radical catalyst system and at least one chain modifier, characterized in that the addition of the modifier to the emulsion is controlled in such a manner that, during the polymerization, the maximum value (R) and minimum value (r) of the ratio of the quantity of the modifier present to the quantity of remaining monomer are within the limits for which to $R:r$ equals 1 to 4.

---

The invention relates to an improvement in the polymerization of conjugated dienes and mainly of butadiene. It is concerned with an emulsion polymerization process and also the improved products which are obtained, particularly the polymer materials having a narrower molecular distribution than the known similar products, with a higher molecular weight.

It seems to be established that factors such as the molecular distribution and the proportion of side chains (particularly of 1,2-vinyl structure) have more effect on numerous properties than other factors, for example, the content of 1,4-cis-structure. It is actually known that the three types of polybutadienes which are actually marketed, with 36%, 94% and 97% of 1,4-cis-structure, present very small differences as regards-properties, and these differences tend to disappear when these polymers are associated with other elastomers. In the conventional emulsion polymerisation technique, the 1,2-vinyl structure which is obtained appears to be limited to 16–17%, and it seems scarcely possible to lower this content. It then seems readily possible to visualise a procedure which permits the aforesaid second factor, namely, the molecular distribution, to be modified so as to bring it within narrower limits.

Important properties of a polymer, such as abrasion resistance and heating resistance, are favoured by a narrow molecular distribution. However, emulsion polymerisation carried out under the usual conditions leads to a polymer which generally has a wide distribution of molecular weight. Under the same conditions, the increase in the molecular weight, correlatively with the lowering of the proportion of modifier, is limited by the occurrence of a gel: it follows that the maximum Mooney viscosity remains limited to the region of 120.

The present invention provides improvements which are mainly due to the fact that it enables polymers with a very narrow molecular distribution to be obtained. It also permits the manufacture of polymers of very high molecular weight, to the point of reaching a Mooney viscosity of the order of 160, without the gel content exceeding 2%. These two combined factors permit the preparation of polymers having a particular suitability for being greatly extended with oils, and especially up to 100 parts of oil to 100 parts of polymer. This suitability is of particular interest in the manufacture of pneumatic tyres and conforms satisfactorily to the present tendency of using rubber which is greatly extended with oil. On the other hand, the products manufactured according to the invention have a very substantially improved heating resistance as compared with known similar products.

It is known that the molecular weight and its distribution in respect of conjugated dienes, particularly polybutadiene, polystyrene-butadienes, etc., prepared in emulsion, are mainly controlled by the addition of an adequate modifier to the reaction medium; thus, n-dodecylmercaptan (DDM) is particularly used in hot operation or ter-dodecylmercaptan (TDM) in cold operation. The principle of the progressive addition, continuously or in fractions, of the modifier was proposed long ago by Kolthoff & Harris (J. Polym. Sci. 2, 49, 1947) and Fryling (Synthetic Rubber—Wiley New York—1954—pages 253–258). It was expected that there would thereby be obtained a uniform inherent viscosity during the polymerisation, a modified and narrower distribution of the molecular weights and also a smaller consumption of modifier. Several authors have attempted to verify this principle, particularly in the manufacture of polystyrene-butadiene, using different methods of continuously introducing the modifier, without however reaching positive results. Thus, Lawrence, Hobson & Boarders (Synthetic Rubber cf.) were surprised to find that the polystyrene-butadiene polymer, obtained hot with continuous introduction of the modifier, has a molecular distribution which is very little different from that of the same polymer prepared under normal conditions, that is to say, by injection of all of the modifier on starting the polymerisation; this is despite the constancy of the inherent viscosity during a polymerisation. Similarly, as regards the cold polymerisation (+5° C.) of the same polymers, Booth-Beason & Bailey (J. of Applied Polym. Sci., vol. 5, No. 13, pages 116–123, 1961) found that the molecular weights and the distribution of these weights do not differ in any significant manner from those of similar rubbers obtained by the usual method when the modifier (TDM) is introduced progressively; the method used by these authors consisted in introducing ⅓ rd of the mercaptan at the moment when the amount of conversion of the monomer into polymer was 5%, the remainder of the modifier being added in equal quantities when the amount of conversion was 10, 20, 30, 40 and 50%.

On the other hand, Uraneck and Burleigh, (J. of Appl. Polym. Sci., vol. 9, No. 4, pages 1273–1283, 1965) proposed the model equation for connecting the mean degree of viscometric polymerisation to the progressive addition of modifier. The method consists in introducing ⅔ rd of the modifier on starting and then the remaining ⅓ rd at the moment when the polymerisation has reached a given amount of conversion. The equation indicates that a minimum in the curve of the mean degree $P_v$/conversion should have occurred for the addition of increments $x_1$ designating the fraction of converted monomer, to which the last third of mercaptan has been added. The addition of TDM to the styrene-butadiene polymerisation system at +5° C. shows effects contrary to those which should be provided by the model equation; however, the addition in increments of ternonylmercaptan causes a minimum in the viscosity curves as a function of $x_1$, modifies the distribution of the molecular weights and requires 34% by weight of less of mercaptan than would be required of TDM all introduced initially.

It was found that the method involving increments of C. A. Uraneck and Burleigh as described above and applied to the polymerisation of butadiene by itself, with TDM as modifier, no longer gives any change in the molecular distribution to a degree capable of making this distribution narrow. Consequently, these fairly recent researches have not permitted the molecular distribution to be affected any more than was permitted by the earlier view, according to which, at any moment, the total quantity of modifier introduced into the polymerisation medium should be directly proportional to the quantity of formed polymer.

The prior art therefore did not permit of providing a possibility of obtaining the narrow molecular distribution which is achieved by the present invention.

The invention does in fact result from the unexpected discovery that a much narrower molecular distribution of the polymer than in the past can be obtained if the proportion of modifier remains constant with respect to the monomer present in the reaction medium, or indeed varies at the very most in a ratio of 1 to 4 during the polymerisation. In other words, if the maximum value reached during the polymerisation by the molar ratio of the modifier present in the monomer which has not yet polymerised is designated by R, while r represents the minimum value of this same ratio, the advantages according to the invention as indicated above can be obtained if $R/r$ is from 1 to 4.

Consequently, the process according to the invention for the emulsion polymerisation of a conjugated diene in the presence of a catalyst and a chain regulator or modifier is characterised in that the introduction of the modifier is regulated in such manner that, during the polymerisation, the maximum value $(R)$ and minimum value $(r)$ of the ratio of the quantity of modifier present relatively to that of remaining monomer are limited to those for which $R:r$ is from 1 to 4.

In the polymerisation and copolymerisation reactions of dienes, it is generally known that the proportion of modifier can vary fairly widely, depending on the chain lengths to be obtained. The molar ratio between the quantity of modifier and the quantity of monomer is usually of the order of from $0.01 \times 10^{-3}$ to $1.5 \times 10^{-3}$, and taking the case of TDM and butadiene as an example, this corresponds to ratios by weight of about $0.035 \times 10^{-3}$ to $5.5 \times 10^{-3}$, namely, 0.0035% to 0.55% of TDM relatively to the butadiene; the most usual proportions in this particular case are from 0.01 to 0.3% by weight or $0.027 \times 10^{-3}$ to $0.81 \times 10^{-3}$ in mols.

In carrying the invention into effect, these same proportions can be used, provided that the ratio $R/r$ between their maximum and minimum values does not exceed 1 to 4.

The invention can be applied to the emulsion polymerisation process in which the catalyst and/or the modifier are added to the reaction medium in fractions or continuously. It is advantageous to effect an initial injection of less than the total of this modifier which is to be used, the remainder then being introduced into the polymerisation medium in a regular manner throughout the entire operation. Preferably, the fraction initially introduced is from 15 to 40% of the total of the required quantity.

The fractions of modifier introduced during the polymerisation can be equal or variable as a function of time, so that the condition $R/r$ equal to 1 to 4 is respected. The added fractions are adjusted according to the content of modifier and monomer remaining in the medium. This content can be established by analytical controls in known manner. It is in the same spirit that the amount of modifier is modified when this latter is added continuously.

In one particularly advantageous embodiment of the invention, in which the polymerisation is carried out continuously, the stream of emulsion flowing through the reaction zone receives additions of modifier in several regions of this zone, in such a way that the condition $R/r$ equals 1 to 4 is satisfied at all points in this zone. Thus, the operation can be effected in a series of reactors through which travels the emulsion containing the necessary ingredients; the modifier is then injected, in fractions, or continuously into each of these reactors, and its proportion will be controlled so that the ratio $R/r$ is from 1 to 4 in each of the reactors. As regards the absolute values of R and r, they may possibly vary from one reaction zone to another or from one reactor to another, preferably within the limits mentioned above, depending on the length of chains which is desired for the polymer.

It is obvious that in this form of the invention, as when working intermittently, the catalyst can also be injected continuously or intermittently at several points along the path of the emulsion. The method of introduction of the catalyst can moreover have an influence on the consumption of the modifier and consequently on the regulation of the supply of this latter. In actual fact, one of the data which are the basis of the present invention is the observation that the modifier is not consumed uniformly during the polymerisation; it is possible that this is due to the influence of the oxidation-reduction catalyst system which is used; in particular, a modifier of the mercaptan type would be oxidised immediately into corresponding disulphide which subsequently can reform the initial mercaptan when the reaction medium has reached the oxidation-reduction equilibrium. For example, by working with a constant rate of modifier, it is thus found, for a rate of conversion of butadiene of about 40%, that the quantity of modifier present in the medium is higher than that which it was for a polymerisation amount of the order of 30%; there has thus been regeneration of the modifier, which would provide the danger of bringing the concentration of this latter to a too high value if this concentration had not been controlled at suitable time intervals. It is thus understood why it is quite surprising that the process of the invention comprises the readjustment of the quantity of modifier to be added during the polymerisation; this readjustment can consist in an increase or a decrease of the continuous supply of the modifier or of its fractions as a function of the polymerisation time.

The invention is illustrated by the non-limiting examples which follow, in which the process was carried out on aqueous emulsions containing 20 to 25% by weight of organic materials. For 100 parts of butadiene, there were used: 4.56 parts of potassium resinate; 0.016 part of $FeSO_4 \cdot 7H_2O$ as reducing agent; 0.09 part of paramenthane hydroxy peroxide as catalyst and 0.2 to 0.35 part of terdodecyl mercaptan (TDM), of which the method of addition is set out in each example.

The polymerisation is conducted with continuous stirring at $+5°$ C. for 7 to 10 hours. The quantity of monomer and modifier remaining in the reaction medium is determined every hour. On conclusion, a sample of the polybutadiene formed is examined from the point of view of the distribution of the molecular weights: a certain weight of polymer is dissolved in cyclohexane; to the solution obtained, there are added increasing quantities of pure ethanol, this causing successive fractions of polymer to precipitate; the fractions of the highest molecular weight precipitate first. After filtration of these fractions, the content of each of them in the sample is determined by weighing, and on the other hand, the molecular weight thereof is determined by a known method. The distribution curves are traced with the molecular weights as abscissae and the percentage of the weights in the sample as ordinates; instead of the molecular weights themselves, it is possible to plot as abscissae the inherent viscosities proportional to these weights. For greater clarity, the curves of the graphs accompanying the present specification are plotted with the intrinsic viscosities $n$ as ml./g. as abscissae and the ratios $10^3 \cdot dW/dn$ of the weight $dW$ in grams of each fraction as ordinates, to the corresponding increase $dn$ of the viscosity (differential curves).

In the examples which follow, the quantities of residual monomer, that is to say, of butadiene which has still not polymerised and in grams, are indicated by the abbreviation B, while the proportion and the quantity in grams of modifier are called respectively M% and M. The weight ratio $M/B$ is indicated by R' and the corresponding molar ratio by R.

FIGS. 1 to 11 represent the distributions of the molecular weights of the products obtained in the following examples.

FIGS. 8, 9 and 9a give the ratios as a function of time, for the examples 4, 5 and 8, respectively.

EXAMPLE 1 (FIG. 1)

This preparation, carried out by the conventional method, serves for comparison with Examples 5 to 11. Under the conditions indicated above, with 0.2% of TDM by weight with respect to butadiene (0.05% in mols), the modifier was introduced all at once at the commencement of polymerisation, at the same time as the catalyst.

The results obtained are indicated below, with the abbreviations B, M and R as defined above.

|  | B | M percent | M | R'×10³ | R×10³ (molar) |
|---|---|---|---|---|---|
| After 1 hr | 91 | 69 | 0.138 | 1.52 | 0.41 |
| After 2 hrs | 83.5 | 24 | 0.048 | 0.575 |  |
| After 3 hrs | 77.7 | 15 | 0.030 | 0.388 | 0.105 |
| After 5 hrs | 67 | 4.7 | 0.0094 | 1.140 |  |
| After 7 hrs | 55.5 | 3.20 | 0.0064 | 0.115 | 0.031 |

As can be seen, the ratio R' varies continuously during the polymerisation, passing from $1.52 \times 10^{-3}$ after 1 hour to $0.115 \times 10^{-3}$ after 7 hours of polymerisation. The ratio $R_{max.}'/R_{min.}' = 1.52/0.115 = 13.2$.

The polymer obtained has a very wide molecular distribution, as shown by the curve in FIG. 1, with only a slight maximum in the region of the abscissa 3.9.

EXAMPLE 2 (FIGS. 2 AND 2a)

This example is likewise intended for comparison with Examples 5 to 11.

The polymerisation is effected in the same way as in Example 1, except that the catalyst is added continuously, while the modifier, as above, is introduced all at once at the start. With 0.2% by weight of TDM, the following results were obtained.

|  | B | M percent | M | R'×10³ | R×10³ |
|---|---|---|---|---|---|
| After 1 hr | 95 | 47.5 | 0.095 | 1.0 | 0.270 |
| After 2 hrs | 86 | 30.5 | 0.061 | 0.71 |  |
| After 4 hrs | 81 | 20 | 0.040 | 0.50 | 0.135 |
| After 5 hrs | 78.5 | 16.5 | 0.033 | 0.42 |  |
| After 7 hrs | 64 | 6 | 0.012 | 0.187 |  |
| After 10 hrs | 40 | 2.5 | 0.005 | 0.125 | 0.034 |

The ratio $R_{max.}'/R_{min.}' = 1/0.125 = 8$.

FIG. 2 shows that the distribution of the molecular weights of the product obtained is very wide, without even showing any maximum.

The same polymerisation reaction was repeated with 0.3% by weight of TDM (i.e., 0.073% in mols) with respect to the starting butadiene, instead of 0.2%. Under these conditions and as shown by the curve in FIG. 2a, a certain narrowing of the molecular distribution is perceived, but it is produced in the range of the low molecular weights: the curve shows a fairly pronounced maximum in the region of the abscissae 50 to 100, that is to say, for the least viscous fractions of the polymer. Consequently, this does not resolve the problem set out at the commencement of the present specification.

EXAMPLE 3 (FIG. 3)

This comparative test was conducted in accordance with the known method, which consists in introducing ⅔ of the total required quantity of modifier at the start into the emulsion polymerisation medium, the last ⅓ being added when the conversion rate of the monomer has reached 30%.

Thus, 0.2% by weight of TDM is used at the start and then 0.1% thereof is added after polymerising for 2½ hours.

The catalyst is introduced all at once at the start.

The course of the operation is then characterised by the following experimental data.

|  | B | M percent | M | R'×10³ | R×10³ |
|---|---|---|---|---|---|
| After 1 hr | 93.3 | 22.9 | 0.0458 | 0.490 | 0.132 |
| After 2 hrs | 75.9 | 15.2 | 0.0304 | 0.400 | 0.108 |
| After 3 hrs | 67.6 | 12.9 | 0.0387 | 0.572 | 0.154 |
| After 4 hrs | 58.9 | 8.0 | 0.0240 | 0.407 | 0.110 |
| After 5 hrs | 53.4 | 18.2 | 0.0546 | 1.022 | 0.276 |
| After 6 hrs | 48.0 | 17.1 | 0.0513 | 1.069 | 0.288 |
| After 7 hrs | 42.1 | 20.9 | 0.0627 | 1.489 | 0.402 |
| After 8 hrs | 40.1 | 25.1 | 0.0753 | 1.877 | 0.507 |

The ration R' varies (FIG. 3a) during the operation between $(0.400 \text{ and } 1.8777) \times 10^{-3}$ and the ratio $$R_{max.}'/R_{min.}' = 4.7$$

The graph of FIG. 3 shows a distinct improvement in the distribution of the molecular weights, since a maximum is drawn towards the abscissa 410, i.e., in the region of the high viscosities; however, this maximum only extends very slightly beyond the ordinate 5, while the major part of the curve reaches the ordinate 3; the proportion of polymers with wide distribution of the molecular weights is thus still very large.

EXAMPLE 4 (FIG. 4)

The polymerisation was conducted in the same known manner as in Example 3, but the third ⅓ of modifier was only introduced when the rate of polymerisation had reached 40%, as against 30% in Example 3. This addition was made after polymerising for 5 hours. The ratio $R' \times 10^3$ has then varied between 0.778 after 1 hour, 0.322 after the 4th hour and 2.226 after the 9th hour of polymerisation, thus passing through a very pronounced minimum (FIG. 8). ($R_{max.}'/R_{min.}' = 6.9$). The curve of FIG. 4, which gives the distribution of the molecular weights of the formed polymer shows a much more narrow distribution than FIG. 2, but less than FIG. 3. It thus seems that, within the scope of the prior art, the results are less satisfactory as soon as one departs from the particular working method of Example 3.

EXAMPLE 5 (FIG. 5)

The emulsion polymerisation of butadiene in accordance with the invention is effected under the general conditions of the preceding comparative examples, but the modifier, terdodecylmercaptan (TDM) is continuously introduced. All the catalyst is supplied at the start.

45% of the total quantity of TDM, namely, 0.135 g. per 100 g. of butadiene, are initially added to the medium to be polymerised; the remaining 55% of this modifier, i.e., 0.165 g., are introduced continuously throughout the polymerisation period. Altogether, 0.3 part by weight of modifier is used to 100 parts of butadiene, as in the second preparation of Example 2—FIG. 2a—and in Examples 3 and 4, but the addition of TDM is regulated so that $R' \times 10^3$ is contained between 0.35 and 1.15 ($R \times 10^3$ between 0.094 and 0.312).

The progress of this polymerisation is characterised by the figures which follow, B, M%, M, R' and R having the same meaning as indicated above.

|  | B | M percent | M | R'×10³ | R×10³ |
|---|---|---|---|---|---|
| After 1 hr | 92.3 | 75.80 | 0.106 | 1.15 | 0.312 |
| After 2 hrs | 80.7 | 22.07 | 0.037 | 0.45 | 0.122 |
| After 3 hrs | 75.7 | 27.12 | 0.080 | 0.66 | 0.178 |
| After 5 hrs | 62.9 | 9.59 | 0.022 | 0.35 | 0.094 |
| After 7 hrs | 55.0 | 15.55 | 0.043 | 0.78 | 0.210 |
| After 8 hrs | 45.0 | 7.80 | 0.023 | 0.52 | 0.140 |

It can be seen that the value of $R' \times 10^3$ fluctuates from the second hour about an approximately constant value close to 0.5, contrary to what happens in Example 4, in which it rises considerably after the minimum reached at the end of 4 hours; FIGS. 8 and 9 illustrate this development of R as a function of time, in respect of Examples 4 and 5, respectively.

The ratio $R_{max.}'/R_{min.}' = 1.15/0.35 = 3.28$ is thus lower than 4 in accordance with the invention and even much lower than in Examples 1 to 4.

The distribution of the molecular weights for Example 5 and as shown in FIG. 5 is incomparably more narrow than for the Examples 1 to 4 of the prior art (FIGS. 1 to 4); in fact, an acute maximum is seen in FIG. 4, reaching a value of $dW/dm$ close to 8 for the abscissa 300, that is to say, in a region of already relatively high molecular weights. Furthermore, a second maximum exists in the zone of high viscosities, in the region of $n=510$.

EXAMPLE 6 (FIG. 6)

In a polymerisation reaction with continuous addition of modifier, a total of 0.2% of TDM relatively to butadiene was used; 20% of this quantity, i.e., 0.04 g. per 100 g. of monomer, were added at the start; the remainder was injected during the polymerisation in such a way that, starting from the end of the first hour, the ratio $R' \times 10^3$ remains between 0.06 and 0.19.

After polymerising for 10 hours, a product was obtained having narrow molecular distribution, as shown in FIG. 6.

EXAMPLE 7 (FIG. 7)

As in Example 6, the proportion of modifier TDM was 0.2% by weight relatively to butadiene, but 35.7% thereof were introduced into the reaction medium at the start, i.e., 0.0714 g., while the remaining 0.1286 g., i.e., 64.3% of the total, was added continuously during 7 hours, so that $R' \times 10^{-3}$ remained between 0.2 and 0.9. The catalyst was added continuously.

The ratio $R' \times 10^3$ developed in the following manner:

After— $R' \times 10^3$
1 hour _____ 0.827
2 hours _____ 0.8
3 hours _____ 0.272
4 hours _____ 0.284
5 hours _____ 0.253
6 hours _____ 0.28
7 hours _____ 0.243

It is seen that, from the 3rd hour, this ratio fluctuated slightly on either side of a value of approximately 0.26, such that it could be considered as being practically constant; $R_{max.}'/R_{min.}'$ was $0.827/0.243 = 3.4$.

FIG. 7 shows the very narrow molecular distribution of the product thus obtained; the maximum for an inherent viscosity of about 450 ml./g. is raised beyond the value of 8 for $dW/dn$.

EXAMPLE 8

0.2 g. of TDM per 100 g. of butadiene, as in Examples 6 and 7, was used at the rate of 0.05 g. at the start (i.e., 25% of the total) and 0.15 g., i.e. the remaining 75%, was introduced continuously for 9 hours. The ratio $R' \times 10^3$ was 0.23 after the 1st hour, 0.200 after 3 hours and then, after each of the following hours, it was successively: 0.408, 0.280, 0.298, 0.368, 0.225, 0.273. Thus, it fluctuated between 0.2 and 0.4 and this signifies practically the constancy of R' (FIG. 9a), the ratio $R_{max.}'/R_{min.}'$ being 2.04. The molecular distribution of the prepared product was of the same type as those given in FIGS. 6 and 7.

EXAMPLE 9

Into a reactor containing 6130 litres of a 2.2% aqueous solution of potassium resinate, there are introduced 3000 kg. of butadiene, 18.9 litres of a 28.6 g./l. solution of $FeSO_4 \cdot 7H_2O$, 6.4 litres of a 141.6 g./l. sulphoxylate solution and 34 litres of a 10.5 g./l. sodium hydrosulphite. Also added to the medium is a "short-stop" mixture comprising 6.8 kg. of SDD; 0.75 kg. of sodium polysulphide and 180 litres of water, as well as 141 kg. of antioxidant.

The contents of the autoclave are kept at 5° C., under a pressure of 2.2 to 2.8 kg./cm.², and the polymerisation is effected while stirring in the usual manner, with progressive introduction of a total of:

5.7 kg. of terdodecylmercaptan, TDM, as chain modifier (0.19% relatively to butadiene), and
3.326 kg. of paramenthane hydoxyperoxide, PMHP, as catalyst.

A quarter of the total quantity of TDM, i.e., 1.425 kg., is introduced at the start, the remainder being continuously poured in at a variable rate, adjusted in such a way that the ratio $R' \times 10^3$ does not deviate from the range 0.475–1.24 (that is to say, molar ratio $$R \times 10^3 = 0.128 \text{ to } 0.334)$$

The catalyst is also added continuously at a decreasing rate.

The course of the polymerisation is set out in the following table, in which the quantities of modifier and catalyst, introduced during each of the ten hours of polymerisation, are respectively indicated in the columns "TDM" and "PMHP."

"C" designates the percentage total of butadiene converted into polymer, present in the emulsion after each hour. R' has the same meaning as before (weight of TDM present over that of monomer still not transformed).

| Time (hr.) | TDM (g.) | PMHP (g.) | C (percent) | $R' \times 10^3$ |
|---|---|---|---|---|
| 0 | 1,425 | 0 | 0 | 0.475 |
| 1 | 427 | 898 | 4.5 | 0.647 |
| 2 | 513 | 658 | 12.5 | 0.543 |
| 3 | 513 | 499 | 18.5 | 0.756 |
| 4 | 513 | 374 | 22 | 0.927 |
| 5 | 513 | 286 | 26.5 | 1.080 |
| 6 | 513 | 211 | 34.3 | 0.900 |
| 7 | 513 | 156 | 39.8 | 0.755 |
| 8 | 257 | 112 | 46.4 | 0.837 |
| 9 | 256 | 75 | 53 | 0.960 |
| 10 | 256 | 56 | 59.7 | 1.240 |

As will be seen, the ratio between the maximum and minimum values of R' was $1.24/0.475 = 2.6$.

The product obtained has properties similar to those of Examples 7 and 8, more particularly a narrow molecular distribution, such as that indicated by the graph in FIG. 7.

EXAMPLE 10 (FIG. 10)

Within the general scope of the conditions of Examples 5 to 8, with $R' \times 10^3$ kept between 0.26 and 0.8, a polymerisation was carried out with 0.15% of TDM, introduced continuously, the catalyst being also added in continuous manner. Like the products of Examples 5 to 8, the product which is obtained has a quite narrow molecular weight distribution with a higher maximum of $dW/dn$ of about 8, situated in the region of the highest viscosities (FIG. 10), than for the aforementioned examples. This development towards the higher molecular weights is due to the reduction in the proportion of modifier. The Mooney viscosity of the resulting product was measured, as such and extended with oil; after vulcanisation, under the conditions indicated in Example 15, mechanical tests led to the following results.

| | | | | |
|---|---|---|---|---|
| Grams of oil per 100 g. of product | 0 | 37.5 | 62.5 | 100 |
| Mooney viscosity ML–4 | 160 | 102 | 61 | |
| Tensile strength, kg. cm.² | | | 178 | 170 | 150 |
| Modulus at 300%, kg. cm.² | | | | 142 | 100 |

EXAMPLE 11 (FIG. 11)

Contrary to Example 10, the proportion of TDM employed (0.35%) was larger than in Examples 5 to 8, this modifier being introduced continuously, in the same way as the catalyst, with the same ratio $R_{max.}'/R_{min.}'$ as in Example 10.

FIG. 11 again shows a narrow molecular distribution with a maximum displaced towards smaller viscosities (abscissa 210) than in Examples 5 to 10, because of the increase in the proportion of modifier.

It is moreover interesting to note the presence of a not so high second maximum in the region of the inherent viscosities of abscissae 410 to 420.

The Mooney ML-4 viscosity of this product is no more than 53, that is to say, comparable with that of the polybutadienes of the prior art. Consequently, by comparing these results with the results of Examples 5 to 10, it is seen that the process according to the invention always leads to narrow distributions of the molecular weights, while making it possible at will to obtain higher or lower viscosities.

Rubber formed from the product of the present example by vulcanisation (as indicated in Example 15) had a tensile strength of 205 kg./cm.$^2$, a modulus at 300% elongation of 130 kg./cm.$^2$, an elongation at break of 410% and a Shore hardness of 63. It was thus quite comparable with the similar commercial rubbers, but had over these latter the advantage of a better resistance to fatigue and heating. This advantage, due to the narrow distribution of the molecular weights, is illustrated later on in the paragraph concerning "elastothermic properties."

EXAMPLE 12

Continuous polymerisation

The operation is effected at 5° C. in 6 reactors disposed in series, continuously fed with:

200 kg./h. of butadiene,
4000 l./h. of 2.3% aqueous solution of potassium resinate
0.44 kg./h. of ferrous sulphate with 7H$_2$O
2.738 kg./h. of paramenthane hydroxyperoxide
4 kg./h. of terdodecylmercaptan (i.e., 0.2% of the butadiene).

The last two adjuvants, i.e. the catalyst and chain modifier, are introduced continously into the inlet of each of the 6 reactors through which the emulsion passes.

The residence time of the reaction medium being 1 hour 40 minutes in each reactor, it follows that this medium receives an injection of catalyst and modifier every 1 hour and 40 minutes. As regards the catalyst, the quantities introduced into the top of the 6 successive reactors are rapidly decreasing: 40% of the total quantity required are added to the inlet of the first reactor, 25.4% to the inlet of the second, 15.2% to the third, and then successively 8.9%, 4.8% and 2.7% for the remaining reactors.

As regards the modifier, 40% (1.6 kg.) thereof are introduced into the top of the first reactor, while the remainder is distributed between the other 5 injection points in such a way that the weight ratio $R' \times 10^3$ is contained between 0.7 and 2.2 (molar ratio $R=0.19$ to $0.6 \times 10^{-3}$) at the outlet of each of the reactors.

The remaining content of monomer and of modifier is determined at each of these outlets; there are given below the conversion rates C of butadiene into polymer, and the ratios $R' \times 10^3$, calculated from these determinations.

| Outlet of the reactor No. | Total polymerisation period | C, percent | $R' \times 10^3$ |
|---|---|---|---|
| 1 | 1h. 40 sec | 6.9 | 1.32 |
| 2 | 3h. 20 sec | 15.5 | 1.69 |
| 3 | 5h | 24.3 | 1.03 |
| 4 | 6h. 40 sec | 38.5 | 0.77 |
| 5 | 8h. 20 sec | 49.2 | 1.40 |
| 6 | 10h | 60.3 | 2.14 |

The ratio $R'_{max.}/R'_{min.} = 2.14/0.77 = 2.78$.

The polymer obtained has the narrow molecular distribution such as that of Examples 7 and 8.

EXAMPLE 13

A continuous polymerisation is carried out in accordance with the working method of Example 12, but with a narrower range of variations of the ratio R' (remaining modifier/butadiene not yet polymerised), namely, $R' \times 10^3$ between 0.9 and 1.65.

For this purpose, the supplies per hour of TDM at the inlet to the reactors are regulated as shown in the following table, in which are also given the polymerisation rates C and the ratios R' at the outlet of the same reactors.

| Reactor No. | Total polymerisation period | TDM introduced in g./h. | C, percent | $R' \times 10^3$ |
|---|---|---|---|---|
| 1 | 0 | 1,600 | 0 | |
|   | 1h. 40 sec | | 7.6 | 0.96 |
|   | 1h. 40 sec | 600 | | |
| 2 | 3h. 20 sec | | | 1.16 |
|   | 3h. 20 sec | 600 | | |
| 3 | 5h | | 25.3 | 1.47 |
|   | 5h | 600 | | |
| 4 | 6h. 40 sec | | 35.3 | 1.61 |
|   | 6h. 40 sec | 360 | | |
| 5 | 8h. 20 sec | | 47.2 | 1.64 |
|   | 8h. 20 sec | 240 | | |
| 6 | 10h | | 58.5 | 0.93 |

It is seen that the ratio between the maximum value 1.64 and the minimum value 0.93 of the ratio $R' \times 10^3$ is here 1.77, and thus close to unity, i.e., to the absolute constancy of this ratio.

The polymer obtained has a very narrow molecular distribution.

After vulcanisation, effected as indicated in Example 15, the mass obtained had the following characteristics:

| | | | |
|---|---|---|---|
| Grams of oil per 100 g. of polymer | 0 | 37.5 | 50 |
| Mooney viscosity ML/4 | 98 | 58 | 45 |
| Tensile strength, kg./cm.$^2$ | 166 | 162 | 156 |
| Modulus 300% | 110 | 96 | 89 |
| Elongation at break, percent | 380 | 420 | 450 |
| Elastic recovery | 9 | 10 | 11 |
| Schob elasticity | 42 | 38 | 31 |
| Goodrich $\Delta T°$ C | 41 | 42.8 | 49.5 |
| Deformation $\Delta h$ percent | 11.8 | 13.6 | 18.7 |

The product according to the invention thus leads to vulcanised rubbers of good elastomeric qualities, which are particularly suitable for the manufacture of pneumatic tyre covers for vehicle wheels.

The recapitulation in the following table of certain data from the foregoing examples makes it possible more easily to see the correlation between the course of the variations of the ratio R' and the distribution of the molecular weights in the polymer obtained. In this table, D designates the ratio between the maximum and minimum values reached during the polymerisation, after the first hour of the latter, by the ratio R', i.e., $R'_{max.}/R'_{min.}$.

| Example No. | $R' \times 10^3$ Max. | Min. | D | Distribution of molecular weights | |
|---|---|---|---|---|---|
| 1 | 1.52 | 0.115 | 13.2 | Wide | Curve 1. |
| 2 | 1.60 | 0.125 | 8 | do | Curve 2. |
| 3 | 1.877 | 0.400 | 4.7 | Slightly narrower | Curve 3. |
| 4 | 2.226 | 0.322 | 6.9 | Wide | Curve 4. |
| 5 | 1.15 | 0.35 | 3.3 | Narrow | Curve 5. |
| 7 | 0.827 | 0.243 | 3.4 | do | Curve 7. |
| 8 | 0.408 | 0.200 | 2.04 | do | |
| 9 | 1.24 | 0.475 | 2.6 | do | |
| 10 | 0.8 | 0.26 | 3 | do | Curve 10. |
| 12 | 2.14 | 0.77 | 2.78 | do | As curve 7. |
| 13 | 1.64 | 0.93 | 1.77 | do | |

It is seen that the working procedure according to the prior art (Examples 1 to 4) with D higher than 4 leads to a wide distribution of the molecular weights, whereas with D smaller than 4 in accordance with the invention, the distribution is narrow, both when polymerisation is carried out intermittently (Examples 5 to 10) and continuously (Examples 12 and 13).

EXAMPLE 14

In an operation according to Example 7, the butadiene was replaced by isoprene. The ratio $R' \times 10^3$ varied between 0.2 and 0.76 from the end of the first hour of polymerisation. The polymer obtained had a narrow molecular distribution similar to that illustrated in FIG. 7.

EXAMPLE 15

A polybutadiene, prepared according to Example 8, with continuous addition of 0.2% of TDM relatively to the butadiene, was mixed with increasing proportions of oil in accordance with the technique known in the industry concerned with vehicle pneumatic tyres (aromatic oil Sundex 890).

Measurements of the mechanical characteristics were carried out on the mixtures obtained and these measurements led to the following results:

| Grams of oil per 100 g. of polymer | 0 | 37.5 | 60 | 100 |
|---|---|---|---|---|
| Mooney viscosity, ML-4 | 156 | 114 | 78 | 46 |
| Tensile strength, kg./cm.$^2$ | 180 | 172 | 128 | |
| Modulus 300%, kg./cm.$^2$ | | 170 | 109 | |
| Elongation at break, percent | 200 | 305 | 330 | |
| Hardness | 75 | 66 | 56 | |
| Elastic recovery | | 78 | | |

It is seen that extensions with 60% to 100% of oil still give very suitable results, whereas the conventional polybutadiene, as is known, can scarcely take more than 60% of oil.

The mechanical characteristics indicated above were established in connection with a product vulcanised in known manner at 145° C. for 80 minutes, after 100 parts of a mixture of polymer and oil had added thereto 54 parts of HAF carbon black, 3 parts of ZnO, 1 part of stearic acid, 1.3 parts of sulphur, 0.7 part of n-oxydiethylene-2-benzthiazyl-sulphonyl amide and 0.1 part of diphenylguanidine (DPG).

PROPERTIES

(1) Viscosity

It is apparent from the foregoing that the polybutadienes according to the invention can be obtained with various viscosities which are equal to or much higher than those of the polymers manufactured by the conventional emulsion method. The products of high viscosity are very attractive, because they can be extended with much larger proportions of oil than the polymers hitherto employed. Given below, by way of comparison, are the Mooney ML-4 viscosities of a few of the products of the preceding examples, as such and mixed with the aromatic oil Sundex 890. TDM indicates the percentage of modifier used in the preparation of the polymer.

| | | Oil to 100 of polymer | | |
|---|---|---|---|---|
| | TDM | 0 | 3.75 | 62.5 |
| Example 1, prior art | 0.2 | 90 | 47 | |
| Example 15, invention | 0.2 | 156 | 114 | 76 |
| Example 10, invention | 0.15 | 160 | 102 | 61 |

(2) Tensile strength

The following tensile strengths in kg./cm.$^2$ were established in respect of vulcanised polymers according to the formula indicated in Example 15. In front of the tensile strength (TS), there is indicated the number of grams of oil per 100 g. of polymer in the sample subjected to the tests.

| | Oil | TS |
|---|---|---|
| Example 1, prior art | 37.5 | 157 |
| Example 15, invention | 37.5 | 180 |
| Example 15, invention | 60 | 172 |
| Example 10, invention | 37.5 | 178 |
| Do | 62.5 | 170 |
| Do | 100 | 150 |

It is seen that additions of oil in amounts of 60 to 100% to the polymers according to the invention enable them still to have good tensile strengths, contrary to what happens to the known commercial products.

(3) Elastothermic properties

The measurements were carried out on two polybutadienes, manufactured by the emulsion method, with different molecular distributions:

(A) A product prepared according to the prior art with a wide distribution, of the type of those indicated in FIGS. 1 to 4;

(B) Polymer prepared according to the invention, chosen to have an equal Mooney viscosity to that of product A.

Each of these polymers was extended with 37.5 parts by weight of aromatic oil Sundex 890 to 100 parts of polybutadiene, and the two products containing the oil had the same Mooney ML-4 viscosity of 58.

They were then each vulcanised at 145° C. for 40 minutes under the same conditions, after having been intimately mixed with the known adjuvants in the following proportions by weight:

| | |
|---|---|
| Polybutadiene with 37.5 parts of oil | 4,125 |
| SBR 1712 (polystyrene-butadiene) | 4,400 |
| SBR 1500 (polystyrene-butadiene) | 3,800 |
| HAF carbon black | 6,400 |
| Dutrex oil V.10 | 137 |
| ZnO | 300 |
| Stearic acid | 100 |
| β-phenyl | 100 |
| Diphenyl guanidine | 20 |
| Sulphur | 175 |

FATIGUE

Tests concerning resistance to repeated compressions were then carried out on the two vulcanised samples in accordance with ASTM standard D623–58; the initial temperature was 38° C., the load 12 kg. and the duration of the test 30 minutes.

The following results were found:

Rise in temperature—A (known product), 52° C.; B (invention), 48° C.

Remanent deformations—A (known product), 12%; B (invention), 7%.

BURSTING TEST

On the other hand, in accordance with the same aforementioned standard, tests were carried out from 100° C. with a load of 24 kg. and the following results were obtained:

Rise in temperature—A, 73° C.; B, 61° C.
Bursting time—A, 1.5 min.; B, 1.4 min.

COLD

The behaviour at low temperatures was established in respect of the two samples in accordance with ASTM standard D746–57T and the following results were obtained:

Limiting temperature of nonfragility—A, −48° C.; B, −51° C.

Fragility temperature—A, −50° C.; B, −58° C.

It is clearly shown by these results that with equal viscosity, the polymers according to the invention, because of their narrow distribution of molecular weight, lead to vulcanized rubbers with very substantially improved elastothermic properties. It is in fact seen in the three series of temperatures indicated above that that of B is several degrees lower than the corresponding value for A; these few degrees do in fact constitute an important technical advance, because they are found in practice to give a great improvement in the resistance to wear, this being particularly important where vehicle pneumatic tyres are concerned.

Although the examples relate to the polymerisation of butadiene and isoprene, the invention is also applicable with advantage to the polymerisation of other conjugated dienes, particularly of hexadienes, heptadienes, octadienes, etc., or even to the copolymerisation of several conjugated dienes.

While polymerization in the above examples was carried out at 5° C., the new method may be worked at other low temperatures, particularly in the range of 0° to 15° C., and preferably between 2° and 8° C.

What is claimed is:

1. In a process for the aqueous emulsion polymerization of conjugated alkadienes having from 4 to 8 carbon atoms, wherein said process is carried out in a reaction mixture that contains a free radical catalyst and a mercaptan modifier, the improvement which comprises including the mercaptan modifier in the reaction mixture in amounts such that, during the polymerization, the maximum value $(R)$ and minimum value $(r)$ of the molar ratio of said mercaptan modifier to unpolymerized conjugated alkadiene in the reaction mixture are within the limits for which $R:r$ is from 1 to 4.

2. The process of claim 1, wherein, during the polymerization, the molar ratio between the quantity of modifier present and the quantity of the unpolymerized conjugated alkadiene in the reaction mixture is from $0.01 \times 10^{-3}$ to $1.5 \times 10^{-3}$.

3. The process of claim 2, wherein said molar ratio is from $0.027 \times 10^{-3}$ to $0.8 \times 10^{-3}$.

4. The process of claim 2, wherein from 15% to 40% of the total quantity of mercaptan modifier employed during said process is introduced into the reaction mixture at the start of polymerization, the remainder of said mercaptan modifier being added progressively during the polymerization.

5. The process of claim 2, wherein the conjugated alkadiene is butadiene, and the mercaptan modifier is tert.-dodecyl mercaptan, and the polymerization is carried out at a temperature of from 2° to 8° C.

6. The process of claim 2, wherein the conjugated alkadiene is selected from the group consisting of butadiene, isoprene, hexadiene, heptadiene, and octadiene.

7. The process of claim 2, wherein the mercaptan modifier is an alkyl mercaptan selected from the group consisting of tert.-dodecyl mercaptan, n-dodecyl mercaptan, and tert.-nonyl mercaptan.

8. Method of producing polybutadiene by polymerizing butadiene in a reaction mixture comprising an aqueous emulsion containing a peroxide catalyst and tert.-dodecyl mercaptan, at a temperature of from 0° to 15° C., wherein the tert.-dodecyl mercaptan is added to the reaction mixture in amounts such that at not more than 1 hour after the beginning of the polymerization reaction, and thereafter throughout the reaction, the molar ratio of tert.-dodecyl mercaptan to non-polymerized butadiene in the reaction mixture is between $0.01 \times 10^{-3}$ and $1.5 \times 10^{-3}$, wherein the maximum value $(R)$ and the minimum value $(r)$ of said molar ratio are such that $R:r$ is from 1 to 4.

References Cited

FOREIGN PATENTS 635,787   4/1950   Great Britain.

OTHER REFERENCES

Incremental Modification of Styrene-Butadiene Rubber With Tert-Nonyl Mercaptan.

JOSEPH L. SCHOFER, Primary Examiner

W. F. HAMROCK, Assistant Examiner

U.S. Cl. X.R.

260—82.1, 94.2, 94.3, 94.7